(12) United States Patent
Miyadera

(10) Patent No.: US 6,336,005 B1
(45) Date of Patent: Jan. 1, 2002

(54) DISPLAY CONTROL SYSTEM FOR CAMERA

(75) Inventor: Shunichi Miyadera, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/323,697

(22) Filed: Jun. 1, 1999

(30) Foreign Application Priority Data

Jun. 2, 1998 (JP) .......................................... 10-152708

(51) Int. Cl.[7] .............................................. G03B 17/18
(52) U.S. Cl. ....................... 396/287; 396/315; 396/429; 348/64
(58) Field of Search ................................ 396/281, 287, 396/296, 310, 315, 317, 318, 319, 321, 373, 374, 429; 348/64, 334

(56) References Cited

U.S. PATENT DOCUMENTS

| 5,389,991 A | * | 2/1995 | Naka et al. | 396/315 |
| 5,581,319 A | * | 12/1996 | Ohashi | 396/374 |
| 5,678,084 A | | 10/1997 | Hori | 396/317 |
| 5,710,954 A | * | 1/1998 | Inoue | 396/374 |
| 5,719,621 A | * | 2/1998 | Tsunefuji | 348/96 |
| 5,845,166 A | * | 12/1998 | Fellegara et al. | 396/429 |
| 5,966,553 A | * | 10/1999 | Nishitani et al. | 396/303 |
| 6,055,381 A | * | 4/2000 | Maruyama | 396/207 |

FOREIGN PATENT DOCUMENTS

| EP | 0851661 A2 | * | 1/1998 |
| JP | 7295060 | | 11/1995 |
| JP | 10-20392 | | 1/1998 |

* cited by examiner

Primary Examiner—David M. Gray
(74) Attorney, Agent, or Firm—Greenblum & Bernstein, P.L.C.

(57) ABSTRACT

A display control system for a camera, which is capable of forming an object image on a film and capturing electronic image of the object and generating image data of the captured image, controls a display device provided to the camera to display an object image and a superimposed image which correspond to the object image and an imprinted image on a photographing film such that a positional relationship of the object image and the superimposed image on the display device is substantially same as a positional relationship of the object image and the another image on the photographing film.

19 Claims, 10 Drawing Sheets

DISPLAY CONTROL SYSTEM FOR CAMERA

BACKGROUND OF THE INVENTION

The present invention relates to display control system for a camera that is capable of forming images on a photographing film, and of capturing electronic image and storing the image data in a memory.

Cameras using a photographing film and having a function of digital camera have been know. That is, cameras capable of forming an image of an object on the photographing film, and capable of capturing an electronic image of an object and storing image data corresponding to the electronic image in a memory have been known. In such cameras, the image data stored in the memory are used to confirm the photographed pictures before the film is developed. Accordingly, such cameras are generally provided with display devices, and by displaying the images corresponding to the image data stored in the memory on the display device, the photographed pictures are confirmed.

Among such cameras, there exists cameras capable of imprinting photographing data, such as a date of photographing, on an image formed on a film. Generally, a user can select whether the photographing data is to be imprinted on the photographing frame for each frame of the image. However, in the conventional cameras, which use the photographing film and has a function of the digital camera, although an image corresponding to each frame on the photographing film can be displayed on the display device, an image corresponding to the photographing data cannot be displayed. Thus, the user cannot confirm, for each frame of the photographed image, whether the photographing data is imprinted.

SUMMARY OF THE INVENTION

It is therefore an object of the present invention to provide an improved display control system for a camera capable of forming images on the film and storing corresponding image data in the memory. The data display control system controls a display device of the camera to display an image accurately corresponding to the an image formed on a photographing film.

For the objects, according to the invention, there is provided, in combination, a camera, which is capable of forming an object image on a film and capturing electronic image of the object and generating image data of the captured image, and a display control system. The camera is provided with: an imprinting system that imprints another image on the object image on the photographing film; and a display device for displaying an object image based on the image data. The display control system controls the display device to display the object image in accordance with the image data and the another image, a positional relationship of the object image and the another image on the display device being substantially same as a positional relationship of the object image and the another image on the photographing film.

Accordingly, an image and photographing data (i.e., the superimposed data) displayed on a display device accurately corresponds to an object image formed on the photographing film and imprinted photographing data formed on the object image.

According to another aspect of the invention, there is provided a display control system for controlling a display device which displays images corresponding to an object image and an imprinted image formed on a photographing film. The display control system comprising: a memory, image data corresponding to the object image and photographing data related to the imprinted image being stored in the memory; a controller that reproduces the object image in accordance with the image data, and generates the superimposed image in accordance with the photographing data, controls the display device to display the object image and the superimposed image, a positional relationship of the object image and the superimposed image on the display device being substantially the same as a positional relationship of the object image and the imprinted image on the photographing film.

According to a further aspect of the invention, there is provided a camera capable of forming an object image on a photographing film and capable of capturing an image of an object and generating image data, the camera is provided with: an imprinting system which forms an imprinted image on the object image; a display device for displaying an image corresponding to image data; a memory, the image data corresponding to the object image and photographing data related to the imprinted image being stored in the memory; a controller that reproduces the object image in accordance with the image data, and generates the superimposed image in accordance with the photographing data. The controller controls the display device to display the object image and the superimposed image such that a positional relationship of the object image and the superimposed image on the display device is substantially the same as a positional relationship of the object image and the imprinted image on the photographing film.

Accordingly, an image and photographing data (i.e., the superimposed data) displayed on a display device accurately corresponds to an image and imprinted photographing data formed on a photographing film.

Optionally, the memory may store position data indicative of a position of the imprinted image in relation to the object image. In this case, the controller is capable of determining the position of the superimposed image on the display device in accordance with the position data stored in the memory.

In particular, the position data may include data indicating aspect ratio of the object image, and then, the controller can control the display device to display the superimposed image within an area where the object image is displayed.

Optionally or alternatively, the position data may include data indicating orientation of the object image, and then, the controller may control the display device to display the superimposed image such that orientation of the superimposed image coincides with the orientation of the object image.

It may be possible that the photographing data includes data indicating a color of the imprinted image, and in this case, the controller may control the display device to display the superimposed image with the color indicated by the data indicating the color of the imprinted image.

Optionally, the photographing data may include data indicating a format of the imprinted image. In this case, the controller may control the display device to display the superimposed image with the format indicated by the data indicating the format of the object image.

In one particular case, the imprinted image may include an image of a date when a photographing was performed.

In another particular case, the imprinted image may include an image of a time when a photographing was performed.

DESCRIPTION OF THE PREFERRED EMBODIMENT

An embodiment of the present invention will be described hereinafter with reference to the accompanying drawings.

Figure 1:
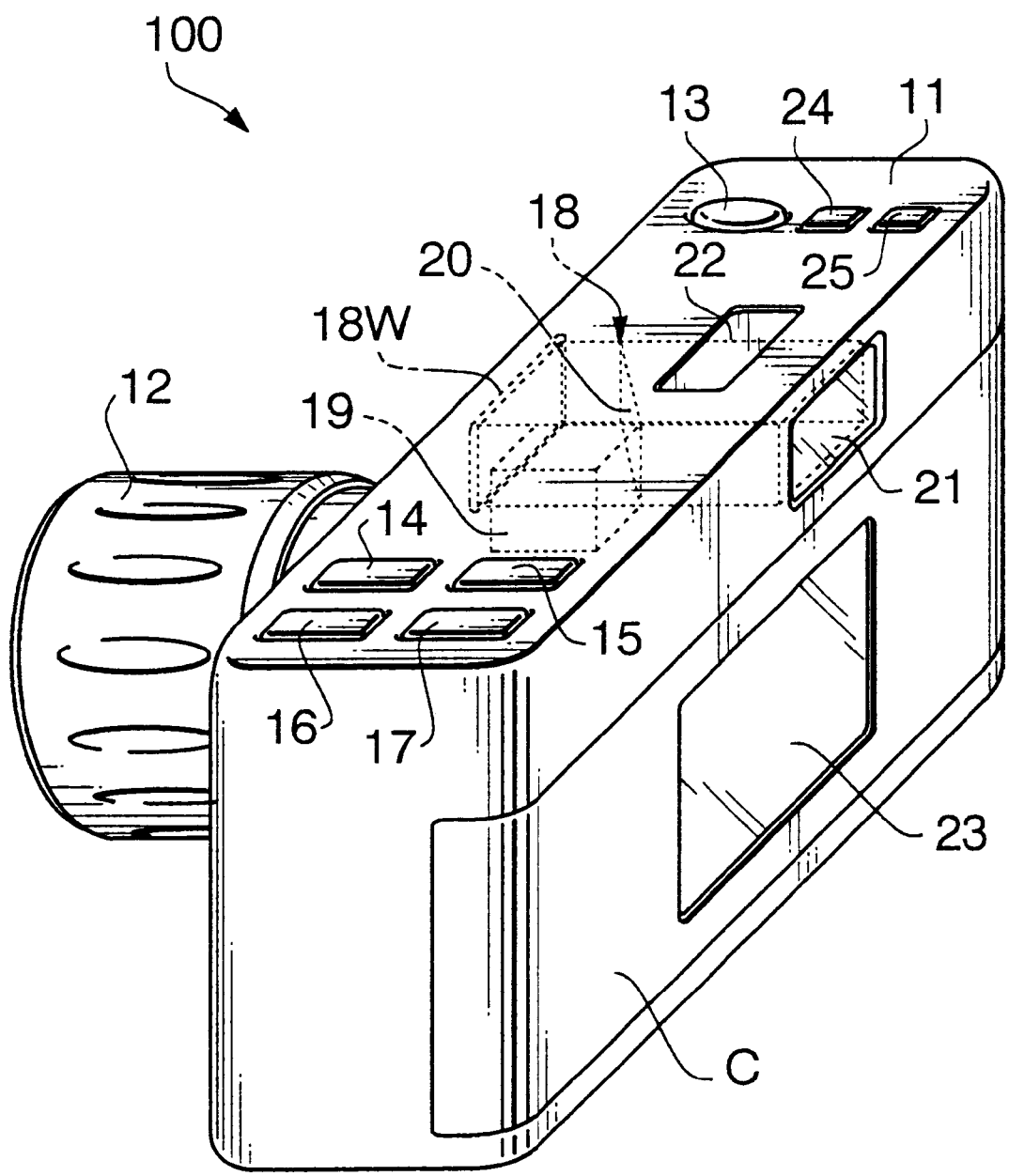
FIG. 1 is a schematic perspective view of a camera according to an embodiment of the invention.

FIG. 1 is a schematic perspective view of a camera 100 to which a display control system according to the present invention is applicable.

The camera 100 uses a photographing film, and also has a function of a digital camera. That is, the camera 100 is capable of forming images on a photographing film, and is also capable of capturing images and storing image data corresponding to the captured image in a memory provided therein.

As shown in FIG. 1, the camera 100 is provided with a body 11, a photographing optical system 12, a release button 13, an UP button 14, a DOWN button 15, a MODE button 16, an ERASE button 17, a display device 22, a panorama button 24, and a frame orientation button 25. On the rear surface of the camera body 11, a back cover C is provided, and an LCD (Liquid Crystal Display) 23 is provided on the back cover C. The back cover C is a part of the body 11 formed as a cover of an opening through which film cartridges are exchanged. The LCD 23 displays an image corresponding to image data stored in a memory.

Figure 2:
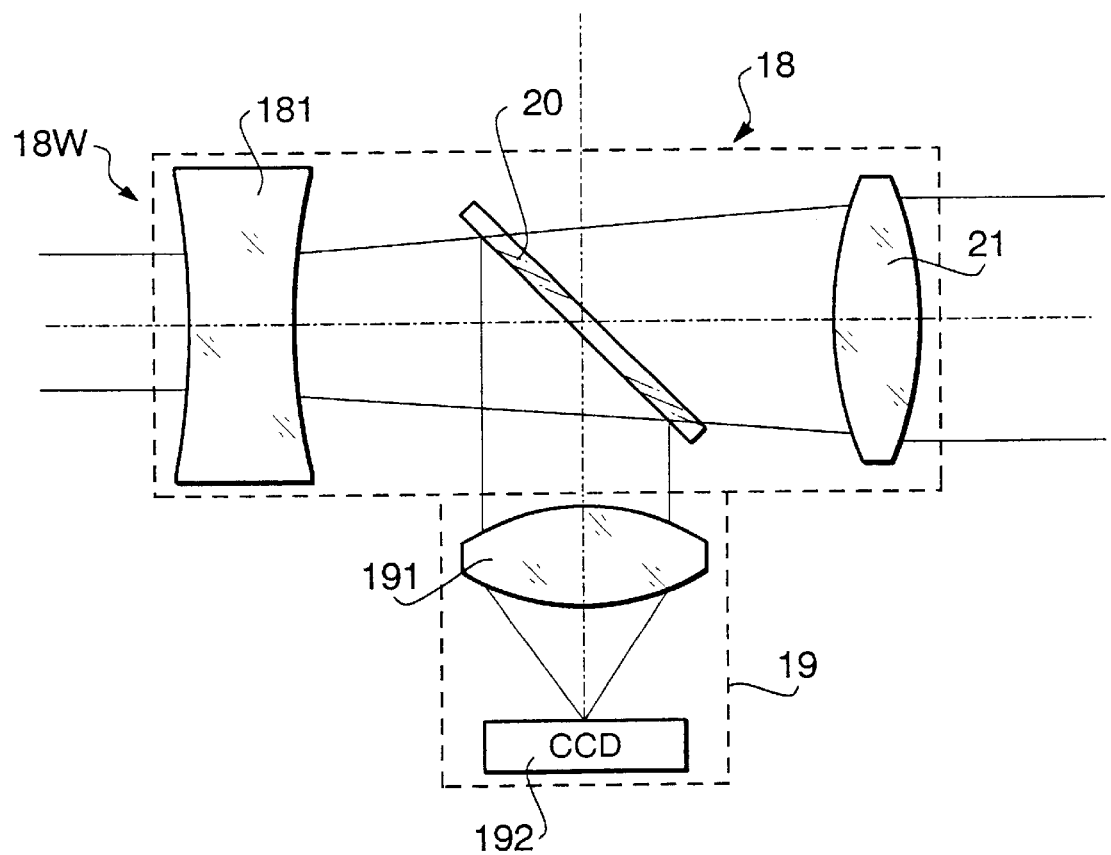
FIG. 2 schematically shows a constitution of the finder system.

The camera 100 also has a finder system 18, an exemplary constitution of which is schematically shown in FIG. 2.

The finder system 18 includes an objective lens 181, a half mirror 20, an eyepiece 21, and an imaging device 19 which includes a charge-coupled device (CCD) 192 and an imaging lens 191. Light from an object enters the finder 18 through a finder window 18W, passes through the objective lens 181, is incident on the half mirror 20, and is split into two components:

(a) a component which is reflected by the half mirror 20, incident on the imaging device 19, i.e., is incident on the imaging lens 191, and forms an image of an object on the CCD 192; and (b) a component which passes through the half mirror 20 and is incident on the eyepiece 21, through which a user is capable of observing the object.

It should be noted that a constitution of the finder 18 is shown in FIG. 2 only to assist in understanding of the invention, and the finder 18 may be replaced with any suitable finder system.

It should also be noted that the LCD 23 is capable of displaying an image corresponding to the image currently formed on the CCD 192.

Figure 3:
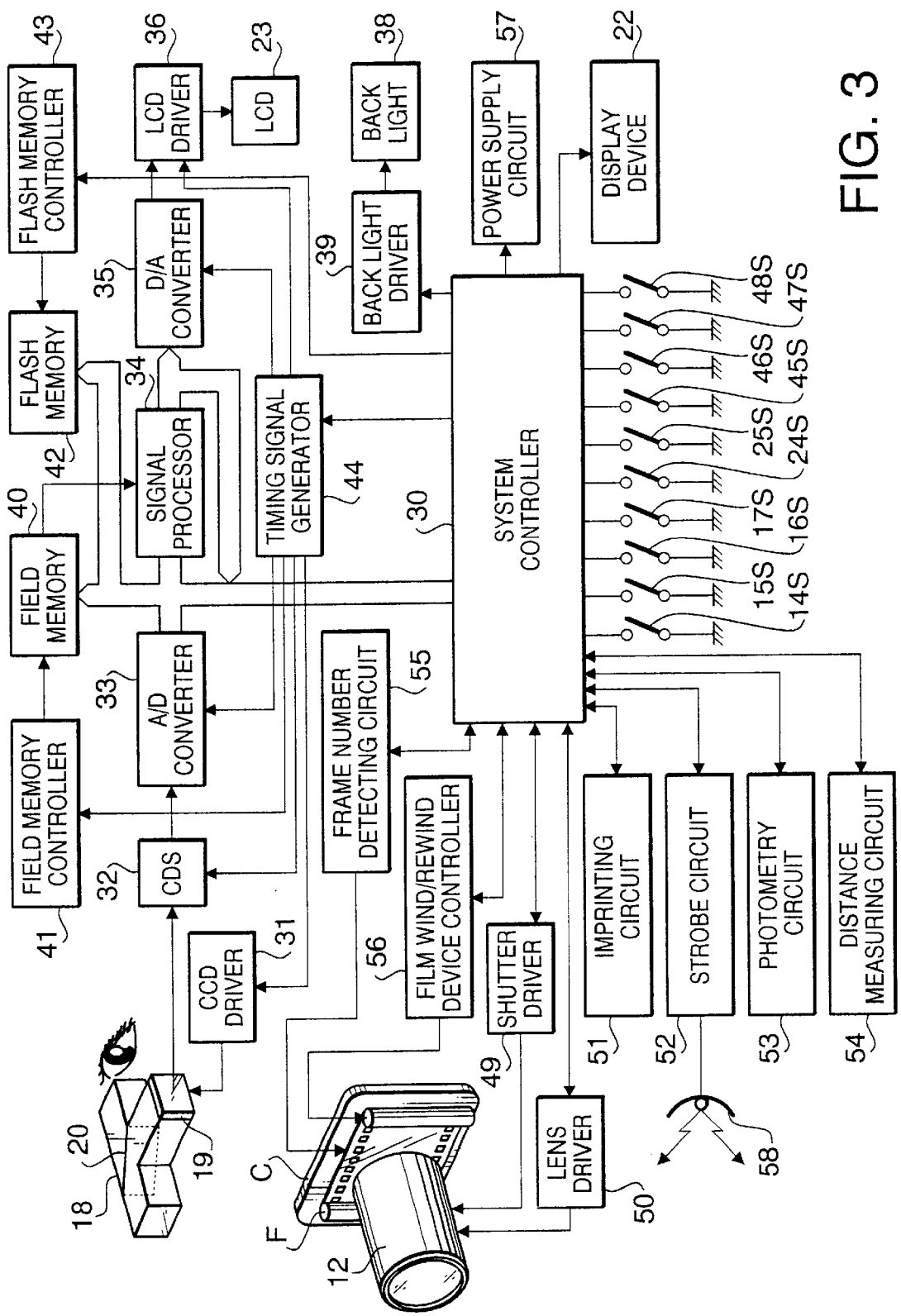
FIG. 3 is a block diagram showing the electronic constitution of the camera shown in FIG. 1.

FIG. 3 is a block diagram showing a control system of the camera 100.

The control system includes a system controller 30, which controls an overall operation of the camera 100.

The imaging device 19 outputs a color image signal corresponding to the image formed on the CCD 192. The imaging device 19 transmits the color image signal under the control of a CCD driver 31. A CDS (correlated dual sampling circuit) 32 removes a resetting noise from the color image signal, and transmits the color image signal to an A/D (analog-to-digital) converter 33, which converts the color image signal to the digital signal.

When the release button 13 is not being depressed, the digital signal generated by the A/D converter 33 is transmitted to a signal processor 34. The signal processor 34 processes the digital signal, and generates a luminance signal and color-difference signals. The signals processed by the signal processor 34 are transmitted to a D/A (digital-to-analog) converter 35.

Then, the analog image signals are transmitted to the LCD 23 through an LCD driver 36. The LCD 23 thus displays an image of the object in accordance with the transmitted image signals. On the rear side of the LCD 23, a back light 38 is provided to illuminate the LCD 23 under control of a back light driver 39.

When the release button 13 is fully depressed, a shutter driver 49 is controlled to open the shutter provided in the photographing optical system 12 so that the photographing film F is exposed to light passed through the photographing optical system 12.

The light passed through the photographing optical system 12 forms an image of an object on the photographing film F. When the photographing film F is sufficiently exposed to light, the system controller 30 controls the shutter driver 49 to close the shutter.

As described above, the camera 100 also functions as a digital camera. Simultaneously with the photographing operation described above, when the release button 13 is fully depressed, data representing a field of image outputted by the A/D converter 33 is temporarily stored in a field memory 40. The image data stored in the field memory 40 is then transmitted to the signal processor 34 where the image data is converted to luminance signal data and color-difference signal data. The data generated by the signal processor 34 is transmitted to the system controller 30. The system controller 30 compresses the data (reduces data size), and transmits the compressed data to a flash memory 42.

The flash memory 42 includes an image data area 42A and a photographing data storing area 42B. The image data compressed and transmitted by the system controller 30 is stored in the image data area 42A. The stored image data corresponds to a frame of the image formed on the photographing film F. Further, in the photographing data area 42B, photographing data related to each image frame of the photographing film F (see FIG. 4) is stored.

Figure 4:
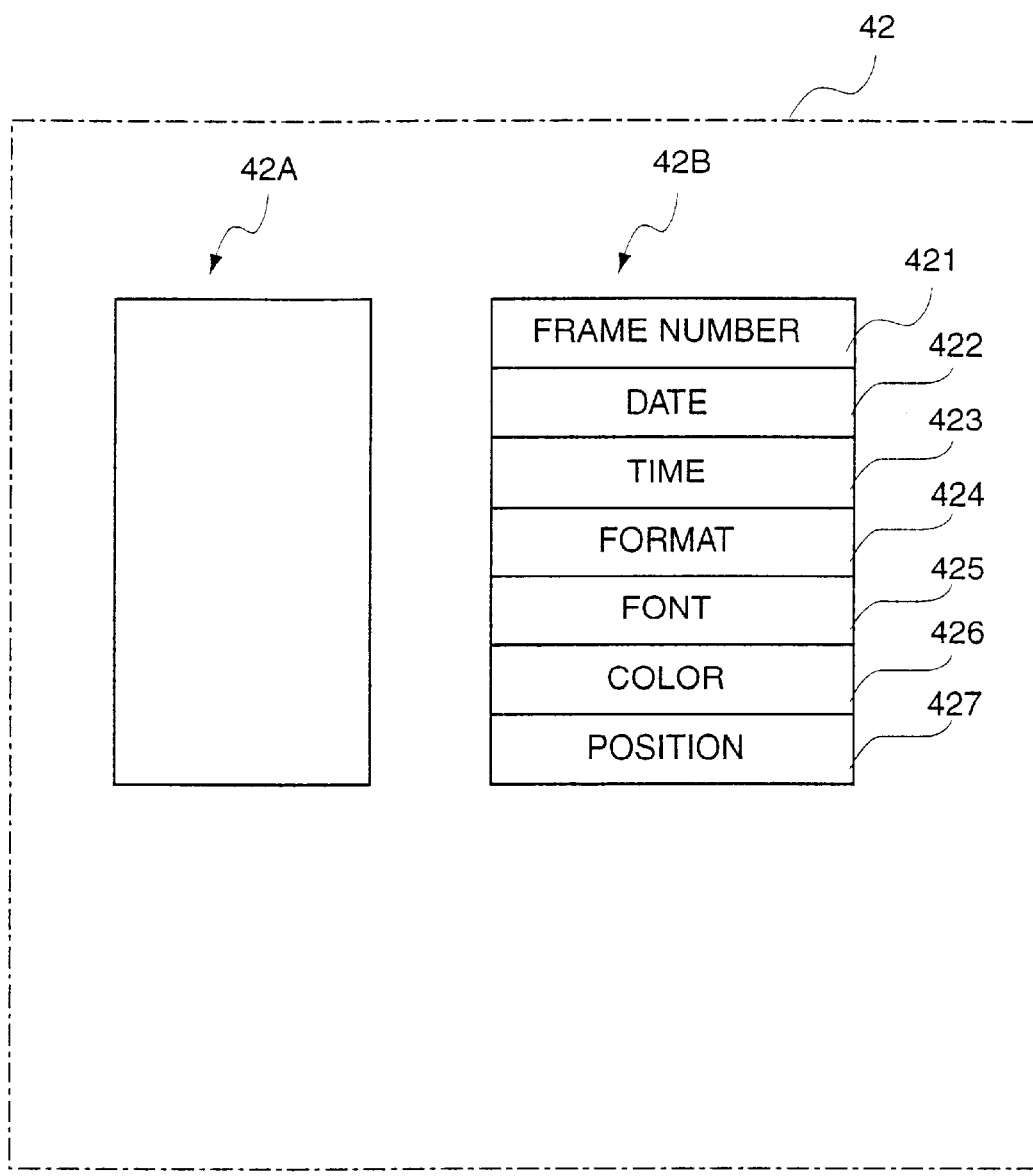
FIG. 4 schematically shows a photographing data storage of a flash memory.

As shown in FIG. 4, the photographing data area 42B includes:

a frame number area 421 for storing the frame number;

a date data area 422 for storing a date when the frame identified by the frame number stored in the frame number area 421 is photographed;

a time data area 423 for storing a time when the frame identified by the frame number stored in the frame number area 421 is photographed.

In the camera 100, a user is able to select a format of the photographing data to be imprinted on each frame of the photographing film F. The photographing data area 42B includes a format data area 424 for storing data indicating a selected format of the photographing data imprinted on the frame that is identified by the frame number stored in the frame number area 421 is photographed.

The photographing data area 42B also includes a font data area 425 for storing font data corresponding to the photographing data. The font data is not set for each frame, but set during assembling process so as to coincide with the font use for imprinting the data on the film F.

In the embodiment, the camera 100 is capable of imprinting the photographing data on each frame of the photographing film F with a desired one of a plurality of predetermined colors. Although not shown, the camera 100 is provided with a plurality of colors of LED's for superimposing the photographing data with different colors. Alternatively, a color LCD may be used. In this case, a single LCD device is sufficient to imprint the photographing data on the film with a desired color. Further, if the color LCD is used for imprinting the photographing data, various types of font may be selected for each frame. In such case, the font data should be stored in the font data area 425 for storing font data for each frame of the photographing film F.

In accordance with the above function for selecting a color of the imprinted photographing data, a color data area 426 is provided in the photographing data area 42B for storing data indicating a color of the photographing data superimposed on each frame.

In the camera 100, the photographing data can be imprinted at different positions, for example, depending on whether a photographing is executed with a landscape framing (a horizontal length being longer than a vertical length) or portrait framing (a vertical length being longer than the horizontal length) so that the position and the orientation of the imprinted data corresponds to the orientation of the image. The position of the photographing data on each frame can be selected by operating the frame orientation button 25 when a photographing is performed. That is, the user can switch the position and orientation of the imprinted photographing data for the landscape framing or the portrait framing. The data related to the position and orientation is stored in a position data area 427.

It should be noted that, in the embodiment, the position and orientation of the imprinted data is changed so as to coincide with the orientation of the object image. However, the invention is not limited to such a configuration, and can be modified in various ways. For example, the camera 100 may be constituted such that the position of the photographing data to be imprinted may be switched between lower right and lower left portions of a frame.

The imprinting of the photographing data on the photographing film F, and switching the position and orientation of the imprinted image with respect to the photographing frame are well known, and an example of a constitution of the data imprinting system is disclosed in U.S. Pat. No. 5,678,084, teachings of which are expressly incorporated herein by reference. It should be noted that U.S. Patent is cited only to assist in understanding of the invention, but are not intended to be limiting of the invention as defined in the attached claims in any way.

A field memory controller 41 controls the read/write operations of the field memory 40, and a flash memory controller 43 controls the read/write operations of the flash memory 42.

To display an image corresponding to a frame of the image data stored in the image data area 42A, the image data corresponding to a desired frame (hereinafter referred to as frame image data) is read out of the image data area 42A, and expanded into its original size by the system controller 30. The expanded frame image data is temporarily stored in the field memory 40 during the expansion process. After the expansion is finished, the expanded digital image data is transferred from the field memory 40 to a D/A converter 35 and is converted into analog image signals (i.e., the luminance and color difference signals). The LCD driver 36 receives the analog image signals from the D/A converter 35, processes them, and transmits them to the LCD 23. The LCD 23 thus displays a static image corresponding to a frame of the image data stored in the flash memory 42 (i.e., the image data area 42A).

When the image data is read out of the flash memory 42, the data stored in the photographing data area 42B and corresponding to the image to be displayed is also read. The system controller 30 generates image data corresponding to the image imprinted on the photographing frame in accordance with the photographing data read out of the photographing data area 42B, and modifies the frame image data when the frame image is expanded and stored in the field memory 40. Thus, the photographing data is superimposed on the frame image if the photographing data has been imprinted on the image of the photographing film F. As above, the image displayed on the LCD 23 precisely corresponds to the image formed on the photographing film F, including the photographing data.

A timing signal generator 44 generates synchronizing signals under control of the system controller 30. With the synchronizing signals, the timing signal generator 44 synchronizes operations of the CCD driver 31, the CDS 32, the A/D converter 33, the signal processor 34, the D/A converter 35, the LCD driver 36, and the field memory controller 41.

The system controller 30 is connected with an UP switch 14S, a DOWN switch 15S, a MODE switch 16S which are turned ON or OFF in accordance with operated status of the UP button 14, the DOWN button 15, and the MODE button 16S. The system controller 30 is also connected with, an erase switch 17S, a panorama switch 24S, a frame orientation switch 25S, a release button full-depression switch 45S, a release button half-depression switch 46S, a power switch 47S, and a back cover switch 48S.

The erase switch 17S alternates its ON/OFF status upon each operation of the erase button 17. The release button full-depression switch 45S is turned ON while the release button 13 is fully depressed, and the release button half-depression switch 46S is turned on while the release button 13 is depressed fully or halfway. The power switch 47S is turned ON/OFF in response to operation of a power switch of the camera 100.

The panorama switch 24S alternates its ON/OFF status upon each operation of the panorama button 24. If a photographing is executed when the panorama switch is ON, the photographing is executed with panorama framing, while if a photographing is executed when the panorama switch 24S is OFF, the photographing is executed with a normal framing.

The frame orientation switch 25S alternates its ON/OFF status upon each operation of the frame orientation button 25. If a photographing is executed when the frame orientation switch 25S is ON, photographing data is imprinted on a frame of the photographing film F so that the orientation and position thereof is suitable for the landscape framing, while if a photographing is executed when the frame orientation switch 25S is OFF, the photographing data is imprinted so that the orientation and position thereof is suitable for the portrait framing.

The back cover switch 48S is a switch provided inside the body 11 to detect whether the back cover C is closed or opened. When the back cover C is closed, the back cover switch 48S is turned ON, and when the back cover C is opened, the back cover switch 48S is turned OFF. The system controller 30 judges whether the back cover C is closed or opened by detecting the status of the back cover switch 48S.

The system controller 30 is also connected with a power supply circuit 57 and the display device 22.

The power supply circuit 57 supplies electric power to the entire system of the camera 100.

The display device 22 displays information such as error messages, the number of the frames having been photographed, and the like. When a photographing data format is selected, a format is displayed on the display device 22.

The lens driver 50 drives, when an auto-focusing operation is performed, a focusing lens included in the photographing optical system 12 to move for focusing.

An imprinting circuit 51 forms an image of the photographing data on a frame of the object image on the photographing film F.

A photometry circuit 53 measures a brightness of an object.

A strobe 58 is driven by a strobe driver 52 to illuminate an object when it is judged that auxiliary illumination is required based on the brightness of the object measured by the photometry circuit 53.

A distance measuring circuit 54 measures the distance from the camera to the object.

A frame number detecting circuit 55 detects the number of the photographed frames of the photographing film F (i.e., the number of images having been formed on the photographing film F), by counting the number of the perforations formed on either side of the photographing film F. Specifically, the frame number detecting circuit 55 includes a photo-interrupter having a light source and a photo sensor. The photo-interrupter is arranged such that the perforations of the film F runs between the light source and the photo sensor. As the photographing film F is fed or rewound, a pulse signal is output by the photo-interrupter (i.e., the frame number detecting circuit 55). By counting the number of the pulses, the number of the perforations passed through the photo-interrupter is detected, and accordingly, the number of frames can be detected.

A film winding device controller 56 controls the operation of winding/rewinding of the photographing film F.

The camera 100 has a plurality of modes of operations, which include:

1. a imprinting format setting mode where a format of the imprinted data is set;
2. an imprinting color setting mode where a color of the imprinted data is set;
3. a photographing/image-capturing mode where image of an object is captured using the CCD 192 and stored in the image data area 42A; and
4. an image reproducing mode where an image corresponding to the image data stored in the image data area 42A of the flash memory 42 is reproduced and displayed on the LCD 23.

By depressing the mode button 16, the operator can choose a mode out of the plurality of modes of operation.

[Superimposition Function Setting Mode]

Figure 5:
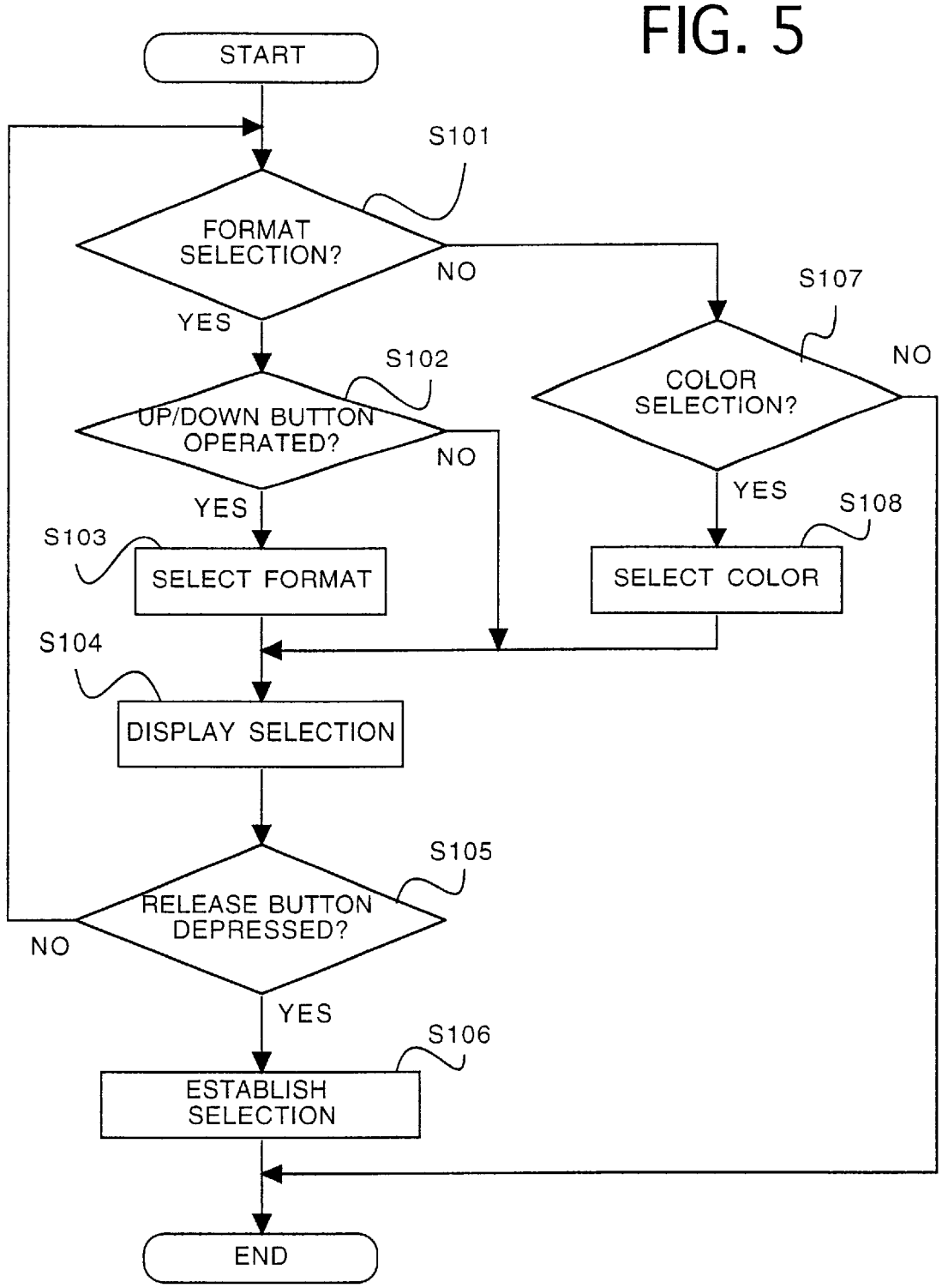
FIG. 5 is a flowchart showing a data format selection procedure.

FIG. 5 is a flowchart showing an imprinting function setting procedure executed by the system controller 30.

In S101, it is judged whether the camera 100 operates in the imprinting format setting mode or imprinting color setting mode. The imprinting format setting mode and the imprinting color setting mode can be selected by operating the mode button 16.

If the camera 100 does not operate in the imprinting format setting mode (S101: NO), control goes to S107. If the camera 100 operates in the imprinting format setting mode (S101: YES), control goes to S102.

Figure 6A:
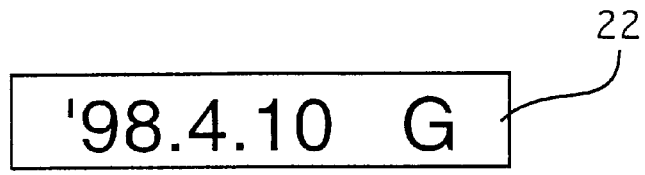
FIGS. 6A–6E show indication of the selected data format displayed on a display device.
Figure 6B:
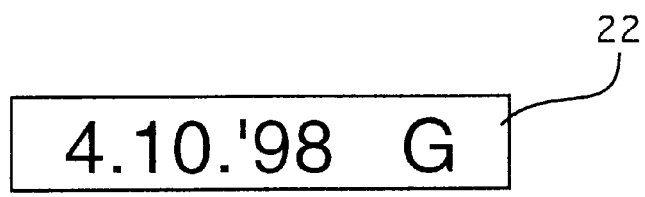
Figure 6C:
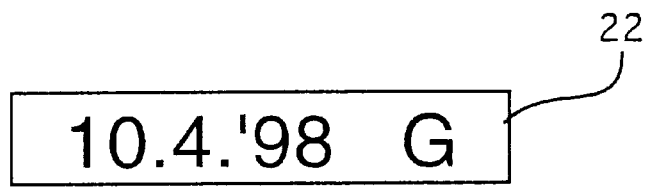
Figure 6D:
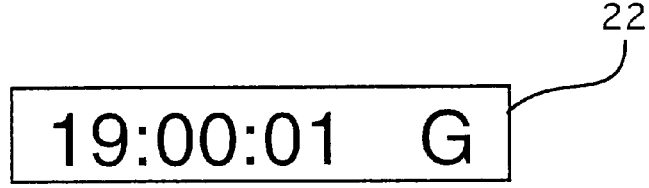
Figure 6E:
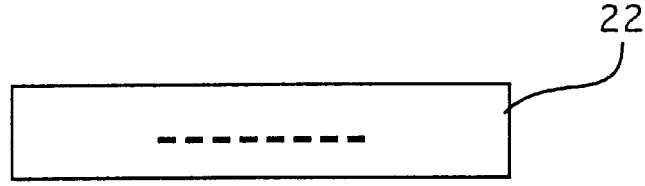
Figure 7A:
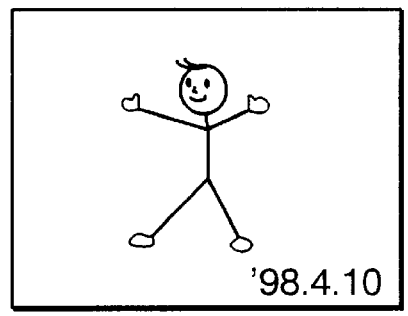
FIGS. 7A–7E shown examples of images displayed on an LCD.
Figure 7B:
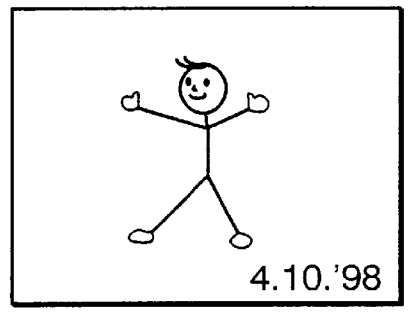
Figure 7C:
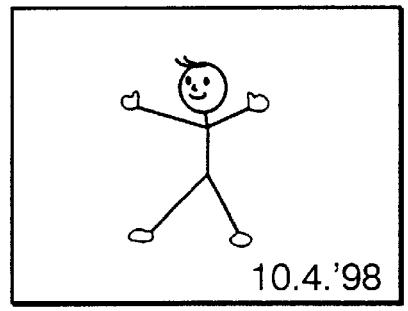
Figure 7D:
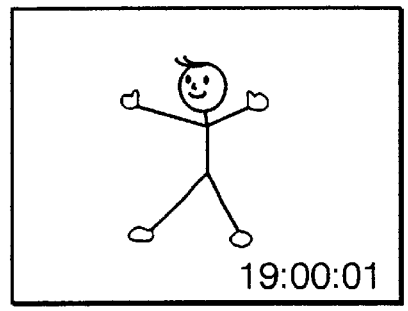
Figure 7E:
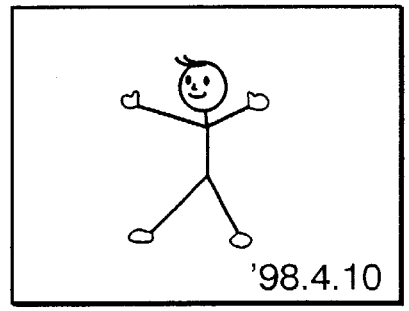

In S102, it is judged whether the UP or DOWN button 14 or 15 is operated. If the UP or the DOWN button 14 or 15 is operated (S102: YES), control goes to S103, where a format of imprinting is selected. Specifically, according to the embodiment, there are four imprinting settings having different formats, and no imprinting setting. The currently selected setting is indicated (S104) by displaying a format on the display device 22 as shown in FIGS. 6A–6D. FIG. 6E shows a case when no imprinting is set. Upon each operation of the UP button 14, the setting is changed from one shown in FIG. 6A through 6E in this order. If the UP button 14 is further operated when the setting shown in FIG. 6E is being selected, then the setting shown in FIG. 6A is selected. Similarly, upon each operation of the DOWN button 15, the setting is changed from one shown in FIG. 6A to the setting shown in FIG. 6E. Further operations of the DOWN button 15 change the setting from 6E through 6A. As described above, upon repeated operation of the UP or DOWN button 14 or 15, the user can change the setting in a cyclic manner, and select a desired setting.

It should be noted that in FIGS. 6A–6E, only three different formats for representation of a photographed date (FIGS. 6A–6C), one format for a photographed time (FIG. 6D), and no imprinting setting (FIG. 6E). The settings (or data formats of imprinting) should not be limited to the above, and various modification can be possible.

In S105, it is judged whether the release button 13 is fully depressed. If the release button 13 is not fully depressed (S105: NO), control goes to S101.

In S107, it is judged whether the imprinting color setting mode is selected. If another mode is selected (S107: NO) control terminates the procedure shown in FIG. 5.

If the imprinting color setting mode is selected (S107: YES), a color of the imprinted data is selected. Similarly to the operation for selecting the data format, by operating the UP button 14 or DOWN button 15, one of predetermined colors can be selected in a cyclic manner. The selected color is indicated on the display device 22, next to the format information, as shown in FIGS. 6A–6D. In the figures, G (i.e., Green) is indicated. In the camera 100, G (Green), R (Red) or Y (Yellow) can be selected for a color of the imprinted data. In the embodiment, since the display device 22 displays only a monochromatic image, the color is indicated by a letter. However, if a color display device is used for indicating the selected format and color of the imprinting data, the format may be displayed with the selected color, and the letter indicating the color may be omitted.

If the release button 13 is fully depressed (S105: YES), the format currently displayed on the display device 22 is established (S106). That is, the system controller 30 controls the imprinting circuit 51 so that the imprinted data will be formed in accordance with the established (selected) format and color.

The imprinting format and color selected in the above procedure is also applied to an image displayed on the LCD 23. That is, the system controller 30 also controls the display device 22 so that the photographing data will be superimposed on an image in accordance with the established format and color.

FIGS. 7A–7E shows images displayed on the LCD 23 corresponding to the superimposed data format selected in accordance with the procedure shown in FIG. 5. It should be noted that, when the camera 100 operates in the image capture mode, the superimposed data displayed on the LCD represent the format and color thereof to be formed on the photographing film F, while if the camera 100 operates in the reproducing mode, the superimposed data displayed on the LCD 23 corresponds to the data superimposed on the photographing film F.

[Photographing/Image-Capturing Mode]

Figure 8:
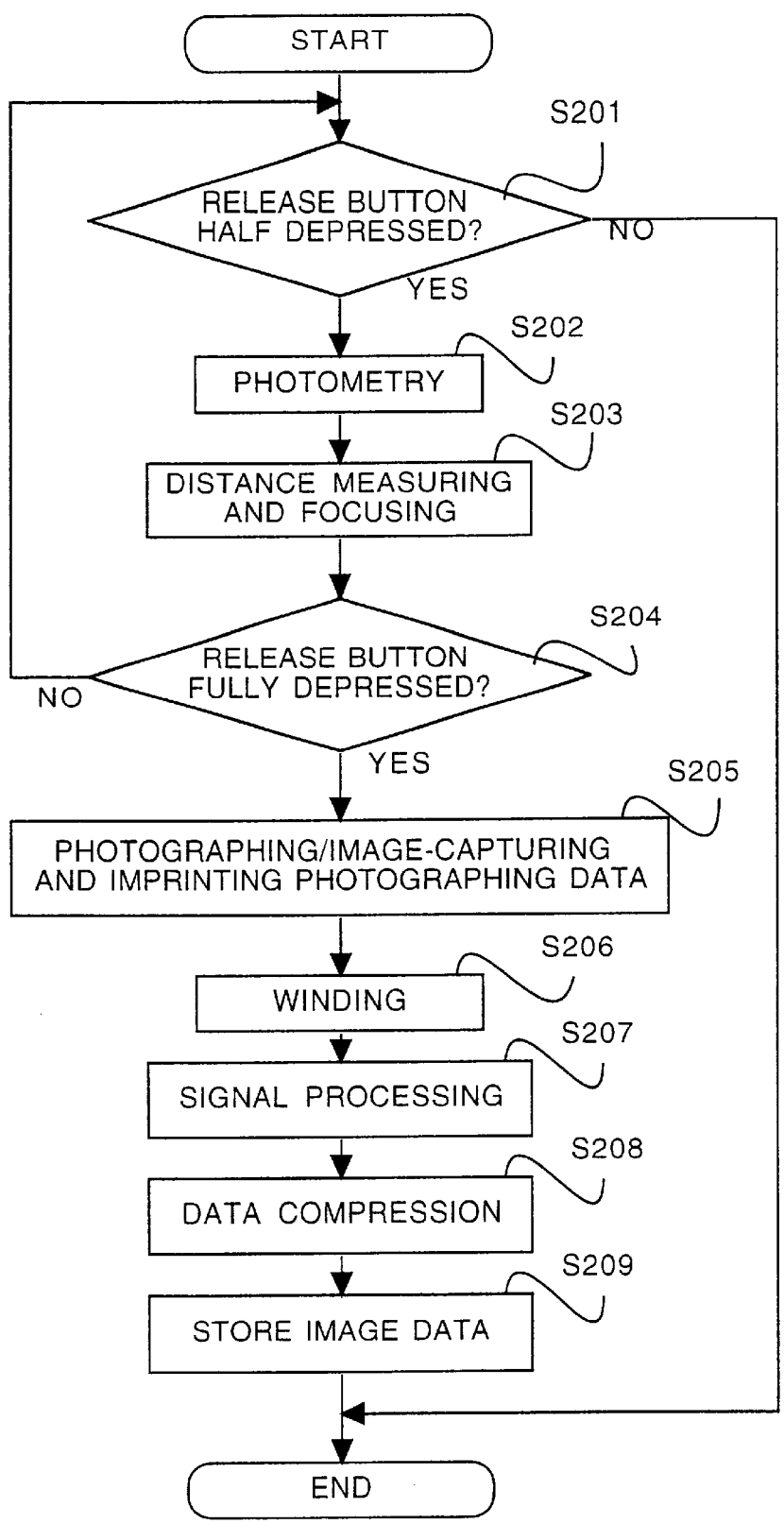
FIG. 8 is a flowchart showing an image capturing procedure.

FIG. 8 shows a flowchart illustrating a photographing/image capturing procedure for forming an image on the photographing film F and capturing and storing electronic image in the flash memory 42.

In S201, it is judged whether the release button 13 is depressed halfway. If the release button 13 is depressed halfway and the release half-depression switch 46S is ON (S201: YES), control goes to S202. If the release button 13 is not depressed fully or halfway (S201: NO), the remaining steps are skipped.

In S202, by the photometry circuit 53, the brightness of an object is detected. Then, based on the detected brightness of the object, a shutter speed and an aperture value is calculated.

In S203, by the distance measuring circuit 54, a distance to the object is measured. Then, based on the measured distance, the system controller 30 controls the lens driver 50 to bring the photographing lens 12 into an in-focus condition. Further, the imaging lens 192 of the imaging device 19 is also moved based on the measured object distance so that a focused image is formed on the CCD 192.

In S204, it is judged whether the shutter button 13 is fully depressed. If the shutter button 13 is not fully depressed (S204: NO), control goes to S201. If it is judged that the shutter button 13 is fully depressed (S204: YES), control goes to S205, where the photographing film F is exposed to light and the image captured by the CCD192 is temporarily stored in the field memory 40. When the film F is exposed, the photographing data is also superimposed in accordance with the settings (the format and the color) set in the procedure shown in FIG. 5.

In S206, the winding circuit 56 starts winding the photographing film F, and control proceeds to S207.

In S207, the image data temporarily stored in the field memory 40 is transmitted to the signal processing circuit 34, and conversion to a luminance signal and color difference signals, and other processes are applied.

In S208, the converted and processed image data is input to the system controller 30, and compressed. In S209, the compressed image data is stored in the flash memory 42. Simultaneously with data storing operation, the frame number, the photographing date and time, the superimposition format and color, the position of the superimposition data are stored in the ID code area 42B of the flash memory 42.

[Image Reproducing Mode]

Figure 9:
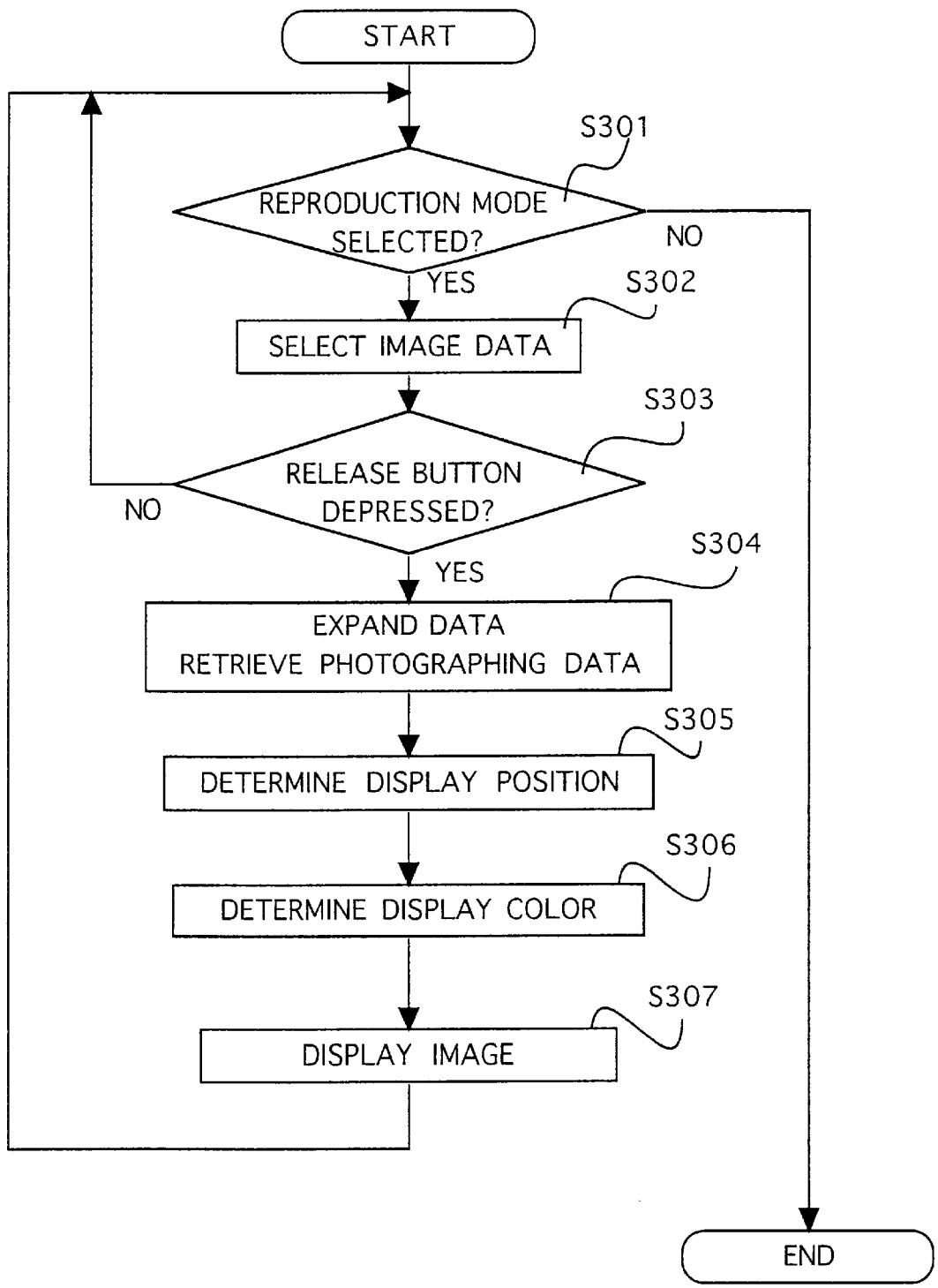
FIG. 9 is a flowchart showing an image reproducing procedure.

FIG. 9 is a flowchart illustrating an image reproducing procedure executed by the system controller 30.

In S301, it is judged whether the image reproducing mode is selected. If another mode is selected (S301: NO), the procedure is terminated. If the image reproducing mode is selected (S301: YES), control goes to S302, where image data is selected. Initially, a previously selected image data (i.e., a frame number of the photographing film F) is selected. If the user operates the UP button 14 or the DOWN button 15, another frame number is selected.

In S303, it is judged whether the release button 13 is fully depressed. That is, by selecting a frame number, and fully depressing the release button 13, the image corresponding to the selected frame number is displayed.

If the release button 13 is not fully depressed (S303: NO), control goes to S301. If the release button 13 is fully depressed (S303: YES), then the image data corresponding to the selected frame number is read out of the flash memory 42, transmitted to the system controller 30 which expands the image data and temporarily stores the expanded image data in the field memory 40. The system controller 30 also reads out the data corresponding to the selected frame number and is stored in the ID code area 42B.

In S305, the system controller 30 determines the position on the LCD 23 at which the photographing data is displayed. Specifically, based on the data stored in the position data area 427, the system controller 30 determines the position on the LCD 23. The format of the photographing data is determined based on the data stored in the format data area 424. The data to be displayed is determined with reference to the data stored in the date data area 422 or time data area 423.

Figure 10A:
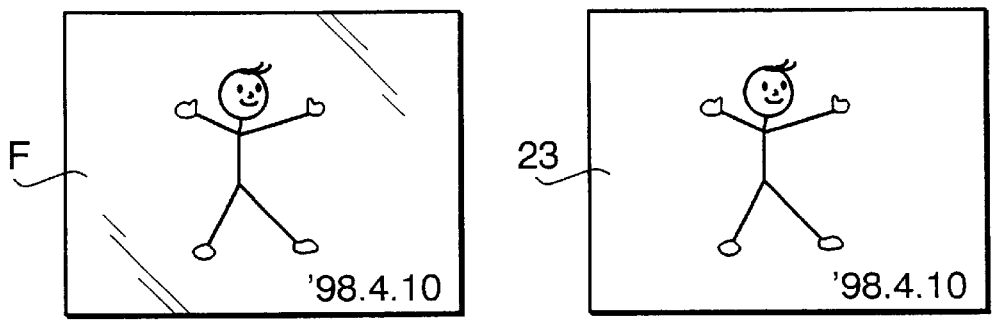
FIGS. 10A and 10B show positions of the photographing data on the images formed on the film and LCD for a landscape framing and a portrait framing.
Figure 10B:
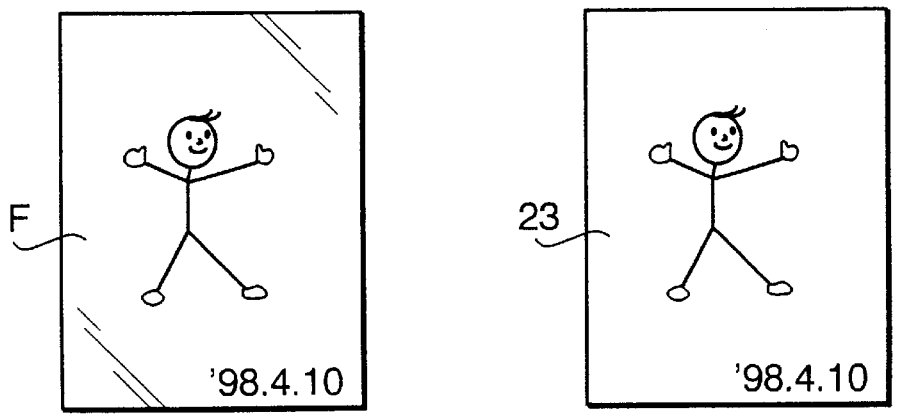
Figure 11:
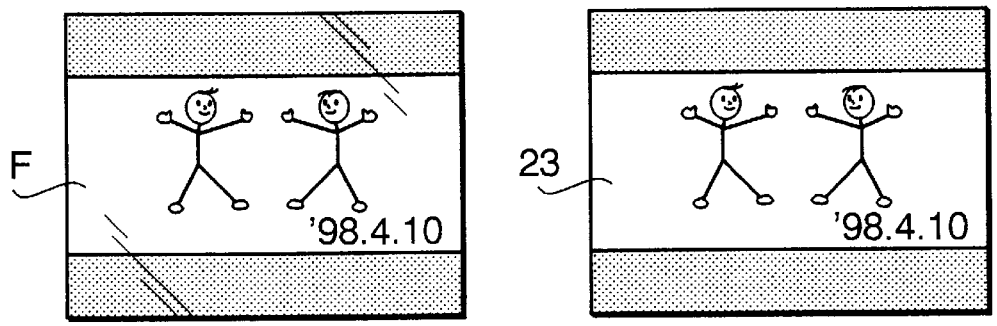
FIG. 11 show positions of the photographing data on the images formed on the film and LCD, for panorama framing.

Further, in S306, based on the data stored in the color data area 426, the system controller 30 determines the color of the photographing data displayed on the LCD 23. As mentioned above, the position and orientation of the photographing data are changed depending on whether the photograph is taken with the landscape framing or the portrait framing. FIGS. 10A and 10B show an example of the photographing data formed on the photographing film F and the LCD 23 for the landscape framing (FIG. 10A) and for the portrait framing (FIG. 10B). The camera 100 is also has the panorama photographing mode. When a photograph has a panorama framing, the images formed on the film and the LCD have an aspect ratio for the panorama framing as shown in FIG. 11, and the photographing data is superimposed within the panorama framing area. It should be noted that, on the LCD 23, no image is displayed outside the panorama framing area.

In S307, the image data stored in the field memory 40 is transmitted to the D/A converter 35 where the image data is converted into an analog image signal. The image signal is then processed by the LCD drive circuit 36, and the image is displayed on the LCD 23. At the same time, the photographing data, which is the same as the data superimposed on the photographing frame, is displayed on the LCD 23. The positioned relationship of the superimposed data with respect to the photographing frame is the same as the positional relationship of the displayed photographing data with respect to the reproduced image displayed on the LCD 23.

In the embodiment, the date and time are described as the photographing data superimposed on the image. However, the data to be superimposed on the image should not be limited to them, but is may be possible to constitute the camera to superimpose various kinds of data, characters and/or pictures.

The present disclosure relates to the subject matter contained in Japanese Patent Application No. HEI 10-152708, filed on Jun. 2, 1998, which is expressly incorporated herein by reference in its entirety.

What is claim is:

1. In combination, a camera and a display control system, said camera being capable of forming an object image on a photographing film and capturing an electronic image of said object and generating image data of the captured image, said camera comprising:
    an imprinting system that imprints another image on said object image;
    a memory that stores photographing data, including a positional relationship of said another image with respect to said object image; and
    a display device that displays the electronic image based on said image data, wherein said display control system controls said display device to display said object image in accordance with said image data and said another image, a positional relationship of said object image and said another image on said display device corresponding to a positional relationship of said object image and said another image on said photographing film.

2. A display control system that controls a display device which displays images corresponding to an object image and an imprinted image formed on a photographing film, said display control system comprising:

a memory;

image data corresponding to said object image and photographing data related to said imprinted image being stored in said memory, said photographing data including data defining a positional relationship between said imprinted image and said object image;

a controller that reproduces said object image based on said image data, and generates a superimposed image corresponding to said imprinted image based on said photographing data, that controls said display device to display said object image and said superimposed image, a positional relationship of said object image and said superimposed image on said display device corresponding to a positional relationship of said object image and said imprinted image on said photographing film.

3. The display control system according to claim 2, wherein said controller determines the position of said superimposed image on said display device in accordance with the data defining a positional relationship stored in said memory.

4. The display control system according to claim 3, wherein said position data includes data indicating aspect ratio of said object image, and wherein said controller controls said display device to display said superimposed image within an area where said object image is displayed.

5. The display control system according to claim 3, wherein said position data includes data indicating orientation of said object image, and wherein said controller controls said display device to display said superimposed image such that orientation of said superimposed image coincides with the orientation of said object image.

6. The display control system according to claim 5, wherein said position data includes data representative of whether said object image has a landscape framing or a portrait framing, and said controller adjusts a position of said superimposed image with respect to said object image and an up-and-down direction of said superimposed image in accordance with the framing of said object image.

7. The display control system according to claim 2, wherein said photographing data includes data indicating a color of said imprinted image, and wherein said controller controls said display device to display said superimposed image with the color indicated by said data indicating the color of said imprinted image.

8. The display control system according to claim 2, wherein said photographing data includes data indicating a format of said imprinted image, and wherein said controller controls said display device to display said superimposed image with the format indicated by said data indicating the format of data represented by said imprinted image.

9. The display control system according to claim 2, wherein said imprinted image comprises an image of date when a photographing was performed.

10. The display control system according to claim 2, wherein said imprinted image comprises an image of a time when a photographing was performed.

11. A camera capable of forming an object image on a photographing film and capable of capturing an image of an object and generating image data, said camera comprising:

a imprinting system which forms an imprinted image on said object image;

a display device for displaying an image corresponding to image data;

a memory;

image data corresponding to said object image and photographing data related to said imprinted image being stored in said memory, said photographing data including data defining a positional relationship between said imprinted image and said object image;

a controller that reproduces said object image based on said image data, and generates a superimposed image based on said photographing data, wherein said controller controls said display device to display said object image and said superimposed image such that a positional relationship of said object image and said superimposed image on said display device corresponds to a positional relationship of said object image and said imprinted image on said photographing film.

12. The camera according to claim 11, wherein said controller determines the position of said superimposed image on said display device in accordance with the data defining a positional relationship stored in said memory.

13. The camera according to claim 12, wherein said position data includes data indicating aspect ratio of said object image, and wherein said controller controls said display device to display said superimposed image within an area where said object image is displayed.

14. The camera according to claim 12, wherein said position data includes data indicating orientation of said object image, and wherein said controller controls said display device to display said superimposed image such that orientation of said superimposed image coincides with the orientation of said object image.

15. The camera according to claim 14, wherein said position data includes data representative of whether said object image has a landscape framing or a portrait framing, and said controller adjusts a position of said superimposed image with respect to said object image and an up-and-down direction of said superimposed image in accordance with the framing of said object image.

16. The camera according to claim 11, wherein said photographing data includes data indicating a color of said superimposed image, and wherein said controller controls said display device to display said superimposed image with the color indicated by said data indicating the color of said imprinted image.

17. The camera according to claim 11, wherein said photographing data includes data indicating a format of said imprinted image, and wherein said controller controls said display device to display said superimposed image with the format indicated by said data indicating the format of said imprinted image.

18. The camera according to claim 11, wherein said imprinted image comprises an image of a date when a photographing was performed.

19. The camera according to claim 11, wherein said imprinted image comprises an image of a time when a photographing was performed.

* * * * *